United States Patent [19]

Kipfelsberger et al.

[11] Patent Number: 4,952,438
[45] Date of Patent: Aug. 28, 1990

[54] HEAT-SHRINKABLE ENVELOPE

[75] Inventors: Christian Kipfelsberger, Hepberg; Andreas Kupczyk, Hagen, both of Fed. Rep. of Germany

[73] Assignee: Firma RXS Schrumpftechnik-Carnituren GmbH, Fed. Rep. of Germany

[21] Appl. No.: 216,492

[22] Filed: Jul. 8, 1988

[30] Foreign Application Priority Data

Jul. 15, 1987 [DE] Fed. Rep. of Germany ....... 3723399

[51] Int. Cl.$^5$ .................. B32B 1/00; B32B 27/12; B32B 31/20
[52] U.S. Cl. .................................. 428/68; 156/85; 156/86; 285/381; 428/34.9; 428/81; 428/128; 428/132; 428/137; 428/193; 428/247; 428/256; 428/913; 174/DIG. 8
[58] Field of Search .................. 156/85, 86; 428/34.9, 428/68, 81, 128, 132, 137, 193, 247, 913; 285/381; 174/DIG. 8

[56] References Cited

U.S. PATENT DOCUMENTS

| 4,421,582 | 12/1983 | Horsman | 156/85 |
|---|---|---|---|
| 4,624,720 | 11/1986 | Pithouse et al. | 156/86 |
| 4,631,098 | 12/1986 | Pithouse et al. | 156/86 |
| 4,709,948 | 12/1987 | Archer et al. | 156/86 |
| 4,729,920 | 3/1988 | McLoughlin et al. | 156/85 |
| 4,743,321 | 5/1988 | Soni et al. | 156/86 |
| 4,761,193 | 8/1988 | Pithouse et al. | 156/85 |
| 4,761,194 | 8/1988 | Pithouse et al. | 156/86 |
| 4,816,309 | 3/1989 | Hutt et al. | 156/86 |
| 4,816,326 | 3/1989 | Jones et al. | 156/86 |

FOREIGN PATENT DOCUMENTS

| 0117026 | 8/1984 | European Pat. Off. . |
| 7501913.5 | 7/1975 | Fed. Rep. of Germany . |
| 1497051 | 1/1978 | United Kingdom . |

Primary Examiner—James C. Cannon
Attorney, Agent, or Firm—Hill, Van Santen, Steadman & Simpson

[57] ABSTRACT

A heat-shrinkable envelope that is composed of a shrinkable component and a reinforcing component having a metallic matrix. The strength is increased on the basis of the metallic matrix and the ability to tear or, respectively, to continue to tear is considerably reduced. In addition, the metallic matrix forms an electrical and/or magnetic shield for components wrapped in the envelope.

21 Claims, 2 Drawing Sheets

HEAT-SHRINKABLE ENVELOPE

BACKGROUND OF THE INVENTION

The present invention is directed to a heat-shrinkable envelope or sleeve comprising at least one heat-shrinkable component and of a mechanical reinforcement component.

British patent application No. 1,497,051, which was the basis of the German Gebrauchsmuster No. 75 01 913, discloses a heat-shrinkable envelope or sleeve having a reinforcing insert for reinforcing the mechanical properties of the sleeve. Here, however, only the longitudinally directed reinforcing elements are used so that the shrink direction of the envelope is not influenced. The result of this, however, is that injuries, such as, for example, tears in a longitudinal direction, can continue unimpeded. This is especially dangerous when these injuries occur adjacent a face edge prior to the heat-shrinking operation, since a further tearing in the longitudinal direction of the envelope cannot be stopped during the shrinking operation as a consequence of the shrinking forces.

In order to solve this problem, for example, weaves or fabrics have also been inserted as reinforcing elements, as disclosed in European patent application No. 0,117,026. In this arrangement, shrinkable weaves are used and are embedded in a non-shrinkable material. In order to achieve a correspondingly higher, mechanical strength, non-shrinkable, heat-resistant, non-metallic threads that proceed in a second fabric direction, are also introduced into these fabrics in addition to the shrinkable threads proceeding in the first shrinkable direction. Thus, the heat-shrinkable component is woven in a matrix with the non-shrinkable component. Since the second direction is defined by the shrinkable components, the inserts of the present invention provide production essentially only against injuries in only one direction. On the other hand, the manufacture of envelopes having such weaves with different components is extremely involved and may also be complicated under certain conditions due to the differently constituted materials. Since the individual components are composed of natural or synthetic, electrically non-conductive materials, for example, electrically as well as magnetic shielding cannot be achieved with such a weave or reinforcing element.

SUMMARY OF THE INVENTION

The object of the present invention is to create a heat-shrinkable envelope or sleeve whose mechanical loadability is increased in comparison to existing structures, wherein electrically, as well as magnetic shielding of the envelope article should be achieved at the same time. This object is achieved in improvements in a heat-shrinkable envelope or sleeve composed of at least one heat-shrinkable component and a mechanical reinforcing component. The improvements are that the heat-shrinkable component is fashioned as a planar layer in the envelope, said mechanical reinforcing component being composed of a metal matrix or metal lattice or grid which extends in two directions in a plane and that is brought into union with the shrinkable component at least over sub-regions and said metal lattice, grid or matrix is deformable during the shrinking process.

In comparison to previous embodiments, the heat-shrinkable envelope of the invention has special advantages in that the mechanical loadability is improved in many respects. Thus, for example, the tearing and continued tearing of the envelope given micro-cracks, notches, unclean cuts or holes is prevented. Improvements with respect to the compressive strength and resistance to impact also occur given such an envelope. It is then also possible that incisions and holes for additional introduction of auxiliary elements, such as, for example, valves, closure elements or similar articles, can be designationally introduced into the envelope of the invention. The fashioning of the reinforcing component in the way of the invention also yields an electrical as well as a magnetic shielding of the article being encased in the envelope so that a shielding in this respect is established without further additional inserts. Given appropriate fashioning of this reinforcing component, it is even possible to generate heat by application of a current source to the metal matrix, and this will initiate a shrinking of the heat-shrinkable component.

The heat-shrinkable envelope of the invention is composed of essentially two components. One component exerts the shrinking force when heated, which is necessary in order to reshape the envelope in accordance with its shape memory. When an article, whose shape is larger than the ultimate shape corresponding to the shape memory of the envelope is then wrapped within the envelope, it can be tightly surrounded. Given corresponding inserts, for example of standard hot-melt adhesive, a tight closure is also additionally created in this process. The envelope of the present invention, however, comprises a metal matrix as a second component, with whose assistance the above-cited problems are solved. Dependent upon application, this metal matrix can involve individual metallic threads or a planar metal fabric or a metal knit as well. These reinforcement components can then be embedded in the shrinkable component itself or they can be embedded in an additional synthetic matrix of the shrinkable component before the introduction or, respectively, application. This latter embodiment facilitates the manufacture of the envelope of the invention since, first, the shrinkable component and, second, the reinforcing component can be adapted to their optimum requirements prior to being connected together.

The shrinkable component can be composed of either a shrinkable polymer planar foil or a matrix with embedded shrinkable polymer fibers. All previously standard shrink compounds come into consideration as possible materials that quite generally encompass every type of cross-linked, crystalline thermal plastic, such as, for example, cross-linked polyolefines. Polyolefines selected from a group consisting of polyethylene, polybutene and similar plastics constitutes a material which is particularly suitable. After extrusion, these basic materials are cross-linked in a known manner by irradiation or by chemical agent and are then widened or stretched. The stretching of the extruded planar foil lends it a shape memory on which the shrinkability is based. Shrinkable, polymer fibers, as already fundamentally disclosed by the above-mentioned European patent application can also be used for the shrinkable component. Since, however, the separate reinforcement component is introduced or, respectively, applied to the envelope of the invention, a mixed weave, as specified in the above-mentioned European patent application, is not required and, thus, the manufacture of the present invention is greatly simplified. Thus, it is expedient to form the shrinkable component in this exemplary embodiment only of shrinkable threads, and a more uniform shrinkage will occur as a result.

Dependent on the application, additional layers, for example layers of glue, can be introduced between the shrinkable component and the reinforcing component. It is also possible and advantageous in special instances to employ a plurality of different metallic materials. Thus, it is also possible in the sense of the invention to apply the metallic reinforcement component to both sides of the shrinkable component as well as here to intensify the above-mentioned advantages of the present invention. Particularly given coated reinforcing components, it is advantageous to extend one longitudinal edge beyond the shrinkable component as an underflap, so that a coverage of the longitudinal gap between the edges of the wrapped sleeve or envelope will occur.

In a further modification of the invention, the metallic reinforcement component is only applied to limited areas, namely in those regions which are jeopardized, for example along the edge portion or at locations at which additional openings are to be formed. This is recommendable, for example, given envelopes that are generally subjected to low mechanical stresses but are protected against the previously occurring faults in the jeopardized areas in this way.

Another advantage of the metallic reinforcement component of the invention in comparison to previously known textile matrix is that the metal matrix, for example, is significantly cheaper to manufacture and has less problems in manipulation.

Significant advantages may also be seen wherein no thermal damage or, respectively, destruction of the metallic reinforcement component can occur due to flame usually used during the shrinking process. Damage due to the micro-organisms, for example molds, is, likewise, not possible. An oxidation of the metallic reinforcing component can be prevented, for example, by embedding the metallic reinforcing component within the heat-shrinkable component. This is reliable because the re-shrunk, polymer material is situated in the individual mesh of, for example, a metallic knit and, thus, completely surrounds the individual wires. Moreover, rust-free wires or weaves, for example tin-plated wires or weaves, can also be used in order to resolve the problem of corrosion.

The construction of the reinforcing component as a metallic matrix, particularly as a fabric, offers significantly improved mechanical properties in comparison to those that were previously possible. This is particularly true in view of the compressive strength and impact stressing of the designation introduction of holes and incisions and of the risk that occur with respect to tearing and continued tearing. The metallic construction also, additionally, offers an electrical shielding, for example for sensitive cable splices, because the Faraday cage is formed in a certain sense. Additional inserts heretofore required for this shielding purpose can be eliminated and, thus, the assembly is simplified.

A further great advantage of such a metallic reinforcing insert as a matix lies in that a heating of the shrinkable component to a temperature at which the shrinkage of the envelope is obtained can be achieved given application to an electrical current source when the metallic matrix is unshielded in the form of heating filiments. Advantages may thereby be seen in a higher shrinking rate and in a chronologically identical, significantly more uniform shrinking of the envelope. The risk of topical or local overheating can also be excluded on the basis of an appropriate control. In addition, there is the possibility that, dependent on the insert type of the metallic matrix, only topical or local limited shrinkage can be carried out on the basis of an appropriate material selection and on the basis of an appropriate combination of materials, as well as on the basis of potentially only local embedments of the matrix. Regions with shrinking to different degrees, for example, can also be produced by such a combination.

Other advantages and features of the invention will be readily apparent from the following description of the drawings, the preferred embodiments and claims.

DESCRIPTION OF THE PREFERRED EMBODIMENTS

Figure 5:
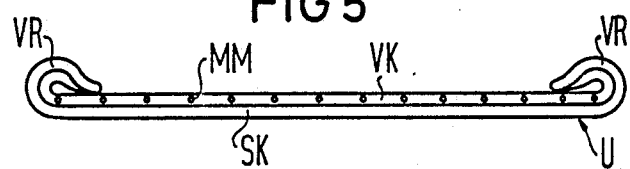
FIG. 5 is an end view of an envelope having closure elements along the longitudinal edges.

The principles of the present invention are particularly useful when forming a heat-shrinkable envelope or sleeve, generally indicated at U in FIG. 5.

Figure 1:
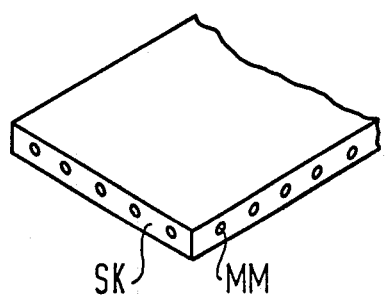
FIG. 1 is a perspective view of a planar foil for an envelope in accordance with the present invention which contains a metallic reinforcing component embedded in a shrinkable component.

An exemplary embodiment of an envelope of the present invention is illustrated in FIG. 1 and has a metallic reinforcement matrix MM embedded in a shrinkable component SK. As in all the following exemplary embodiments this metallic matrix can be formed of individual, thread-shaped metal elements that are used either in a loose structure, in a grid-shaped structure or in a woven or, respectively, knit structure. The individual metallic elements, however, must be flexible enough that a shape change is possible, as required during the shrinking process of the shrinkable component SK. The individual metal elements for such structure can also be formed by a plurality of individual thread elements so that the individual elements can be smaller in diameter. Given such an execution, however, the flexibility of the metallic matrix is considerably enhanced. The individual, thread-shaped metal elements can, for example, be composed of steel, copper or other metals, whereby the cross section of these metal elements can be executed in any arbitrary geometrical shape dependent on the metal and in accordance with other requirements.

Figure 2:
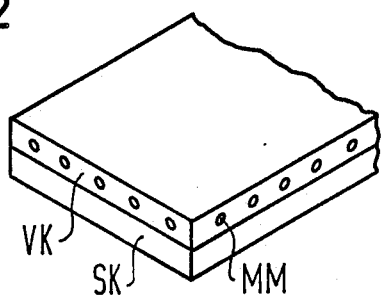
FIG. 2 is a perspective view of a combination of a reinforcing component having the embedded matrix and a shrinkable component.

In an embodiment illustrated in FIG. 2, the metal matrix MM is embedded in a separate reinforcement component VK. This structure is then applied to a shrinkable component SK as a separate layer. The reinforcement component VK is composed of plastic, preferably of the same material as the shrinkable component. For example, both components can be formed of a polyethelene, wherein the reinforcement component is not cross-linked or is only slightly cross-linked in contrast to the amount of cross-linking of the shrinkable component SK. Considerable advantages in the cohesion of the individual layers will occur given identical material, since a fusing of the material can be practically insured. The reinforcement component VK and the shrinkable component SK, however, can be joined with the assistance of an intermediate layer of a known hot-melt type adhesive.

Figure 3:
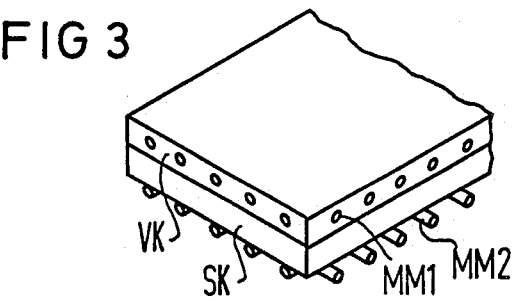
FIG. 3 is a perspective view of an exemplary modification of the embodiment of FIG. 2, which includes an additional metallic matrix.

Another embodiment comprising an additional metallic matrix MM2 that is applied to a second side of the shrinkable component SK is illustrated in FIG. 3. In this arrangement, the first side, for example, is provided with a reinforcement component VK in which the metal matrix MM1 has been embedded based on the principle of the embodiment of FIG. 2. In this embodiment according to FIG. 3, improved properties with respect to strength and with respect to electrical as well as magnetic shielding capabilities will occur. In the way indicated here, however, further composite foils can also be produced within the sense of the invention, whereby the mutual adhesion can occur, either directly or on the basis of adhesion promoters.

Figure 4:
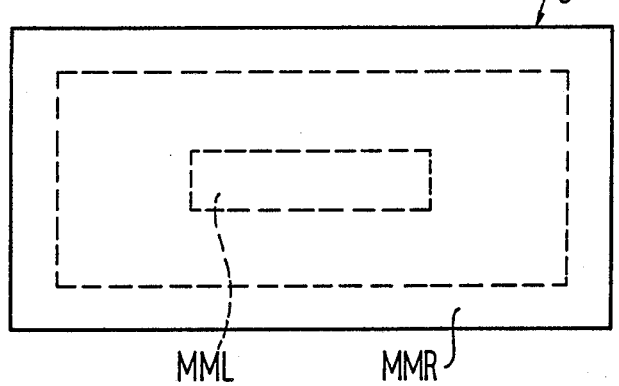
FIG. 4 is a plan view of an envelope illustrating the various sub-regions containing the reinforcing components.

The reinforcement component VK, for example, can be arranged to be in only certain regions on the shrinkable component SK, as illustrated in FIG. 4. For example, the matrix may be arranged along the edge regions MMR or for specific regions, such as, for example, in an introduction region MML, through which an additional element, such as a valve or the like, will be introduced. Holes must be created for the introduction of these elements, and these holes also retain their shape and size during the shrinking process due to the presence of the reinforcing component. This could only be carried out with great difficulty in the previously known means. The closure element or clamp elements for the formation of branchings can, thus, also be inserted into the face end output in these particular regions.

The shrinkable sleeve or envelope U, as illustrated in FIG. 5, has a closure element VR along its longitudinal edges, with whose assistance the envelope U can be held together when it is placed around or wrapped around an article. It is indicated here that the longitudinal edges comprise longitudinally extending beads, into which closure elements of an arbitrary type can be introduced. Dependent on the requirements, the envelope U is composed of a composite structure, as already set forth above, for example, it is composed of a shrinkable component SK having a reinforcement component VK comprising a metallic matrix MM and dependent upon the use, an additional layer of hot-melt adhesive can be applied thereto.

Figure 6:
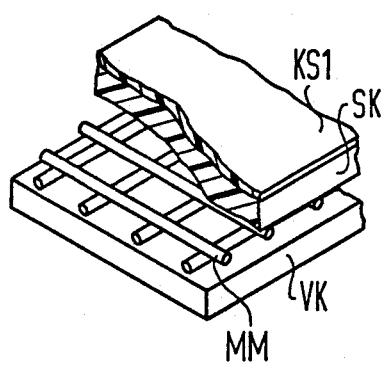
FIG. 6 is a perspective view with portions broken away of an exemplary embodiment comprising a matrix constructed of individual reinforcement elements in a grid-shaped structure.

A composite structure of an envelope of the invention composed of a reinforcement component VK having a metal matrix MM, a shrinkable component SK and an additional layer of, for example, glue KS1 is illustrated in FIG. 6. An example has been selected here in the illustration wherein the metallic matrix MM is applied to a carrier foil of the reinforcing component VK. However, the embedment of the matrix into the carrier foil of the reinforcing component VK is, likewise, conceivable. In the illustrated exemplary embodiment, the union between the reinforcement component VK and the shrinkable component SK can occur in the interspaces or between the strands forming the metal matrix MM, for example, on the basis of the material fusing. The adhesive layer KS1 can, likewise, be applied at the side of the reinforcement component VK with identical effect. This is dependent on which side ultimately faces toward the article which is to be enveloped and sealed within the envelope. A rectangular, grid-shaped structure is shown here as an example of the metal matrix MM. Of course, however, other structures are also conceivable. Their main requirement is that they be flexible enough and that they allow a shape change of the shrinkable component during the shrinking and that they will adapt to this shape change. Thus, then thread-shaped elements that are combined in a strand-like structure to form a composite element for the metallic matrix are particularly suitable. The flexibility is particularly enhanced on the basis of this strand-like structure.

Figure 7:
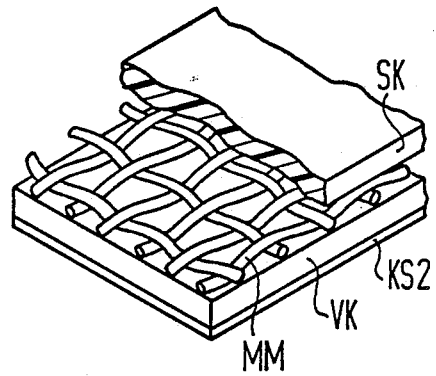
FIG. 7 is a perspective view with portions broken away for purposes of illustration of an exemplary embodiment having a knitted or, respectively, woven structure of metallic thread elements as the reinforcing component.

A knit or woven embodiment of the metallic matrix MM is illustrated in FIG. 7 and has individual thread-shaped metal elements which are woven with one another. These weaves or knits can be arranged on or inside the reinforcing component VK. Such an embodiment fulfills all the demands which were set forth hereinabove. As in the case of all preceding examples, this weave arrangement of a metallic matrix can be embedded into the material of a carrier foil or layer of the reinforcing component VK, wherein the embedment can also be undertaken as an embedding involving two identical reinforcing components VK. In this instance, the union occurs either on the basis of additional adhesive promoters or on the basis of the materials fusing into spaces of the metal matrix. In this way, the metal matrix is surrounded on all sides by the plastic material of the reinforcing component VK so that a corrosion of the metallic matrix cannot occur. In general, the joining and the structure of the overall arrangement can be modified and compiled dependent on the desired requirements. Here, for example, an adhesive layer KS2 is applied to the reinforcing component VK. The remaining conditions are identical to the embodiments already set forth hereinabove.

It has been assumed that in all of the above-mentioned exemplary embodiments that the shrinkable component SK is formed of a planar foil that has received its shape memory after the extrusion by cross-linking and subsequent stretching. The invention, however, is also extended to shrinkable components SK that are fashioned as shrinkable weaves or, respectively, fabrics, whereby the individual elements are composed of shrinkable polymer threads. These polymer threads can be embedded as a composite in an additional polymer plastic foil foil in the same or similar way as the metallic matrix. The planar structure is, again, obtained in this way and is joined to the remaining layer of elements in the fashion set forth hereinabove. The structure formed by embedding the shrinkable weave into the layer will function as a planar shrink film.

An envelope with different shrinking regions can be produced utilizing the corresponding selection of the reinforcing component with full-surface or part-surface metal matrix. Regions shrinking to a greater or lesser degree or not at all can, thus, be constructed by correspondingly providing strong or multiple layer metallic matrix inserts. As a result thereof, for example, corresponding support elements become superfluous and the assembly is greatly facilitated.

Although various minor modifications may be suggested by those versed in the art, it should be understood that we wish to embody within the scope of the patent granted hereon all such modifications as reasonably and properly come within the scope of our contribution to the art.

We claim:

1. In a heat-shrinkable envelope composed of at least one heat-shrinkable component and of a mechanical reinforcing component, the improvements comprising the shrinkable component being constructed as a planar foil member for the envelope and, the mechanical reinforcing component being composed of at least a metallic matrix that is brought into union with the shrinkable component at least over sub-regions of the envelope and said metallic matrix being deformable during the shrinking process.

2. In a heat-shrinkable envelope according to claim 1, wherein the metallic matrix is formed of wires.

3. In a heat-shrinkable envelope according to claim 1, wherein the metallic matrix is fashioned as a weave or knit.

4. In a heat-shrinkable envelope according to claim 1, wherein the metallic matrix is fashioned as a grating.

5. In a heat-shrinkable envelope according to claim 1, wherein the metallic matrix is directly applied to a shrinkable component, preferably by means of an adhesive promoter.

6. In a heat-shrinkable envelope according to claim 1, wherein the mechanical reinforcing component includes a carrier foil and the metallic matrix is applied to said carrier foil.

7. In a heat-shrinkable envelope according to claim 1, wherein the reinforcing component includes a carrier foil and the metallic matrix is embedded in said carrier foil.

8. In a heat-shrinkable envelope according to claim 1, wherein the reinforcing component includes a carrier foil, said matrix being combined with said carrier foil and being secured to the shrinkable component to form a multiple layer composite.

9. In a heat-shrinkable envelope according to claim 1, wherein the shrinkable component is formed of a cross-linked synthetic material, said reinforcing component has a carrier layer of the same synthetic material, which is not cross-linked to the same degree as said shrinkable component.

10. In a heat-shrinkable envelope according to claim 9, wherein the synthetic material of said carrier foil and said shrinkable component is a polyethylene.

11. In a heat-shrinkable envelope according to claim 1, wherein the metallic matrix is composed of different metal elements.

12. In a heat-shrinkable envelope according to claim 1, wherein the metallic matrix is composed of individual elements having different cross sectional shapes.

13. In a heat-shrinkable envelope according to claim 1, wherein the reinforcement component comprises individual layers and includes an auxiliary layer of hot-melt glue arranged between the individual layers.

14. In a heat-shrinkable envelope according to claim 1, wherein the reinforcing component is arranged in selected regions on the envelope.

15. In a heat-shrinkable envelope according to claim 1, wherein the envelope has composite foil composed of closure elements along the longitudinal edges.

16. In a heat-shrinkable envelope according to claim 1, wherein the shrinkable component is composed of a cross-linked and stretched polyolefin.

17. In a heat-shrinkable envelope according to claim 16, wherein said polyolefin is selected from a group consisting of polyethylene, polybutene and similar synthetic materials.

18. In a heat-shrinkable envelope according to claim 1, wherein the metallic matrix is constructed as heating filiments which are connectible to a current source.

19. In a heat-shrinkable envelope according to claim 1, wherein the metal matrix has different strengths in different regions so that shrinking to different degrees is created in different regions.

20. In a heat-shrinkable envelope according to claim 1, which includes regions of the envelope having multiple layers of metallic matrixes to change the shrinking characteristics in those regions.

21. In a heat-shrinkable envelope according to claim 1, wherein the planar foil is formed of a matrix of shrinkable polymer fibers embedded in a layer of polymer material.

* * * * *